US008487973B2

(12) United States Patent
Kinoshita et al.

(10) Patent No.: US 8,487,973 B2

(45) Date of Patent: Jul. 16, 2013

(54) LIGHT SOURCE CONTROL CIRCUIT, IMAGE FORMING APPARATUS, AND METHOD OF CONTROLLING THE LIGHT SOURCE CONTROL CIRCUIT

(75) Inventors: Izumi Kinoshita, Hyogo (JP); Kunihiro Komai, Osaka (JP); Tatsuya Miyadera, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 26 days.

(21) Appl. No.: 13/315,417

(22) Filed: Dec. 9, 2011

(65) Prior Publication Data

US 2012/0147116 A1 Jun. 14, 2012

(30) Foreign Application Priority Data

Dec. 10, 2010 (JP) ................................ 2010-275851

(51) Int. Cl.

*B41J 2/435* (2006.01)

*B41J 2/385* (2006.01)

(52) U.S. Cl.

USPC ............ 347/237; 347/247; 347/234; 347/118

(58) Field of Classification Search

USPC ................................ 347/118, 234, 237, 247

See application file for complete search history.

(56) References Cited

U.S. PATENT DOCUMENTS

2012/0062681 A1* 3/2012 Miyadera et al. ............ 347/116

FOREIGN PATENT DOCUMENTS

| | | | |
|---|---|---|---|
| JP | 2007088928 | A | 4/2007 |
| JP | 2008036850 | A | 2/2008 |
| JP | 2008276075 | A | 11/2008 |
| JP | 2009027683 | A | 2/2009 |
| JP | 2009151286 | A | 7/2009 |
| JP | 2010217732 | A | 9/2010 |
| JP | 2011068127 | A | 4/2011 |

* cited by examiner

*Primary Examiner* — Stephen Meier

*Assistant Examiner* — Sarah Al Hashimi

(74) *Attorney, Agent, or Firm* — Harness, Dickey & Pierce, P.L.C.

(57) ABSTRACT

An optical writing device forms an electrostatic latent image on a photosensitive element by a connected light source controlled by a light source control circuit that includes: a pixel data output unit; a pixel data correcting unit that corrects a skew between main scanning line of electrostatic latent image and photosensitive element and a local deviation of the electrostatic latent image on the main scanning line, and outputs pixel data; a pattern generating unit that outputs pixel data for forming a predetermined pattern in an electrostatic latent image; a first light source control unit for causing a first light source, that needs correction of the local deviation, to emit light; a second light source control unit for causing a second light source, that does not need correction of the local deviation, to emit light; and a switch that switches between a first transmission status and a second transmission status.

7 Claims, 10 Drawing Sheets

FIG.12

SHIFT POSITION ON MAIN SCANNING LINE
XX-TH PIXEL, XX-TH PIXEL, XX-TH PIXEL, ...

SHIFT DIRECTION
POSITIVE

FIG.13

| LIGHT SOURCE CHIP NO. | 01 | | 02 | | 03 | | 04 | | | 26 | |
|---|---|---|---|---|---|---|---|---|---|---|---|
| DOT NO. | 01 | 97 | 01 | 97 | 01 | 97 | 01 | 97 | · · · | 01 | 97 |
| POSITIONAL DEVIATION AMOUNT | 0 | 0 | 0 | 0 | 3 | 3 | 3 | 5 | | 0 | 0 |

FIG. 14

| REGISTER NO. | BIT LENGTH | CORRESPONDING DOT NO. |
|---|---|---|
| 1 | 2 | 001 |
| 2 | 2 | 025 |
| 3 | 2 | 049 |
| 4 | 2 | 073 |
| 5 | 2 | 097 |
| 6 | 2 | 121 |
| 7 | 2 | 145 |
| 8 | 2 | 169 |
| **9** | **4** | **193** |
| 10 | 2 | 217 |
| 11 | 2 | 241 |
| 12 | 2 | 265 |
| 13 | 2 | 289 |
| 14 | 2 | 313 |
| 15 | 2 | 337 |
| 16 | 2 | 361 |
| **17** | **4** | **385** |
| ⋮ | | |

FIRST CHIP (registers 1–8)

SECOND CHIP (registers 9–16)

FIG.15

| | | |
|---|---|---|
| REG [1 : 0]<br>2-BIT REGISTER | BIT [1] | 0: 1 LINE IN POSITIVE DIRECTION |
| | | 1: 1 LINE IN NEGATIVE DIRECTION |
| | BIT [0] | 0: NO CORRECTION 1: CORRECTION |

FIG.16

| | | |
|---|---|---|
| REG [3 : 0]<br>4-BIT REGISTER | BIT [3 : 1] | 000: 1 LINE IN POSITIVE DIRECTION |
| | | 001: 2 LINES IN POSITIVE DIRECTION |
| | | 010: 3 LINES IN POSITIVE DIRECTION |
| | | 011: 4 LINES IN POSITIVE DIRECTION |
| | | 100: 1 LINES IN NEGATIVE DIRECTION |
| | | 101: 2 LINES IN NEGATIVE DIRECTION |
| | | 110: 3 LINES IN NEGATIVE DIRECTION |
| | | 111: 4 LINES IN NEGATIVE DIRECTION |
| | BIT [0] | 0: NO CORRECTION 1: CORRECTION |

FIG.17

| REGISTER NO. | BIT LENGTH | CORRE-SPONDING DOT NO. | SETTING VALUE | | |
|---|---|---|---|---|---|
| 1 | 2 | 001 | 00 | NO POSITION CORRECTION | FIRST CHIP |
| 2 | 2 | 025 | 00 | | |
| 3 | 2 | 049 | 00 | | |
| 4 | 2 | 073 | 00 | | |
| 5 | 2 | 097 | 00 | | |
| 6 | 2 | 121 | 00 | | |
| 7 | 2 | 145 | 00 | | |
| 8 | 2 | 169 | 00 | | |
| 9 | 4 | 193 | 0000 | | SECOND CHIP |
| 10 | 2 | 217 | 00 | | |
| 11 | 2 | 241 | 00 | | |
| 12 | 2 | 265 | 00 | | |
| 13 | 2 | 289 | 00 | | |
| 14 | 2 | 313 | 00 | | |
| 15 | 2 | 337 | 00 | | |
| 16 | 2 | 361 | 00 | | |
| 17 | 4 | 385 | 1110 | 3 LINES IN NEGATIVE DIRECTION | THIRD CHIP |
| 18 | 2 | 409 | 00 | NO POSITION CORRECTION | |
| 19 | 2 | 433 | 00 | | |
| 20 | 2 | 457 | 00 | | |
| 21 | 2 | 481 | 00 | | |
| 22 | 2 | 505 | 00 | | |
| 23 | 2 | 529 | 00 | | |
| 24 | 2 | 553 | 00 | | |
| 25 | 4 | 577 | 0000 | SKEW CORRECTION | FOURTH CHIP |
| 26 | 2 | 601 | 00 | | |
| 27 | 2 | 625 | 11 | | |
| 28 | 2 | 649 | 00 | | |
| 29 | 2 | 673 | 11 | | |
| 30 | 2 | 697 | 00 | | |
| 31 | 2 | 721 | 11 | | |
| 32 | 2 | 745 | 00 | | |
| ⋮ | | | | | |

LIGHT SOURCE CONTROL CIRCUIT, IMAGE FORMING APPARATUS, AND METHOD OF CONTROLLING THE LIGHT SOURCE CONTROL CIRCUIT

CROSS-REFERENCE TO RELATED APPLICATIONS

The present application claims priority to and incorporates by reference the entire contents of Japanese Patent Application No. 2010-275851 filed in Japan on Dec. 10, 2010.

BACKGROUND OF THE INVENTION

1. Field of the Invention

The present invention relates to a light source control circuit, an image forming apparatus, and a method of controlling the light source control circuit, and in particular, to an optical writing control device capable of supporting different kinds of light sources.

2. Description of the Related Art

Recently, there has been a tendency for promoting conversion of information into an electronic form, and accordingly, an image processing apparatus, such as a printer and a facsimile machine used for outputting electronic information and a scanner used for converting a document into an electronic form, have become key devices. An image processing apparatus having an image capturing function, an image forming function, a communication function, and the like, is often used to form a multi function peripheral (MFP) which is usable as a printer, a facsimile, a scanner, and a copying machine.

Of these image processing apparatuses, electrophotographic image forming apparatuses are widely employed as image forming apparatuses used for outputting electronic documents. An electrophotographic image forming apparatus forms an electrostatic latent image by exposing a photosensitive element to light, and develops the electrostatic latent image to form a toner image using a developer such as toner, transfers the toner image onto a sheet, and discharges the sheet.

In the electrophotographic image forming apparatus, an optical writing device that exposes the photosensitive element to light may employ a laser diode (LD) light source or a light emitting diode (LED) light source. The LD light source includes a light source that emits a beam for exposing the photosensitive element, and a deflector, such as a polygon mirror, for deflecting the emitted beam to scan the entire surface of the photosensitive element in a main scanning direction. On the other hand, the LED light source includes an LED head in which chips of LED light sources are arranged across the surface of the photosensitive element in the main scanning direction.

In the case of using the LD light source, when the trajectory of the beam which is made to scan the photosensitive element by the polygon mirror is deviated from the main scanning direction of the photosensitive element, it is necessary to execute a skew correction process which corrects the skew of an image to be formed. In the case of using the LED light source, it is necessary to execute a skew correction process for correcting the skew of the LED head with respect to the photosensitive element and an undulation correction process for correcting an assembly error (hereinafter, referred to as "undulation") of the LED chips assembled in the LED head (for example, see Japanese Patent Application Laid-open No. 2009-027683 and Japanese Patent Application Laid-open No. 2008-036850).

Generally, for the skew correction process described above, pixels in the main scanning direction are divided into a plurality of blocks, and when the pixel data stored in the line memory is read out and input into a light source device, a line memory, that reads pixel data out of pixels, is shifted in units of blocks in the sub-scanning direction so as to correct the skew. On the other hand, when the LED light source is used, an undulation correction is performed by dividing pixels in the main scanning direction into a plurality of blocks according to the LED chips described above and then shifting, in units of blocks, the line memory, from which pixel data are read out, in the sub-scanning direction according to a correction value that is set according to an assembly error of the LED chip when the pixel data having been stored in the line memory is read out and input into the light source device.

For an optical writing device, however, designing a circuit of an optical writing control device needs a large cost when the device controls a light source based on information of an image to be formed and outputted. Because there is a difference in the light source that is to be controlled between the optical writing device with the LD light source and the optical writing device with the LED light source, it is necessary, in principle, to design an optical writing control device for each of the optical writing devices. However, because a large cost is required to design the circuit of the optical writing control device as described above, there is demand for an optical writing control device capable of supporting both the LD light source and the LED light source.

In the case of the LD light source, the shift amount of a pixel in the sub-scanning direction in the skew correction process is determined in units of a line. In the case of the LED light source, because it is not necessary to scan the beam in the main scanning direction, it is easy to increase a light emission frequency in the sub-scanning direction, that is, it is easy to increase the resolution in the sub-scanning direction. In addition, the shift amount of the pixel in the sub-scanning direction in the skew correction process and the undulation correction process can be reduced to one pixel or less such as a half of a pixel or a quarter of a pixel.

Meanwhile, some of the optical writing devices include a pattern generating unit that generates various patterns such as a MUSIC pattern for color correction, a process control pattern for process control, and a forgery prevention pattern for forgery prevention. As described above, when the skew correction process or the undulation correction process is performed after the pattern generation, if an image is shifted by one line as is performed with the LD light source, a pattern at the boundary between the blocks collapses, causing a trouble in a subsequent pattern reading process.

In this regard, when the LD light source is used, it is desirable to perform the pattern generating process after the skew correction process is performed. In this case, the generated pattern is not subjected to the skew correction process; however, because local pixels are not shifted even when an image is skewed, the pattern remains to be recognizable over the whole image.

In the LED light source, the undulation occurs due to the assembly error of the LED chips in the LED head as described above. Thus, when a pattern is generated after the undulation correction is performed, because the generated pattern has not been subjected to the undulation correction, the pattern locally collapses due to the assembly error of the LED chips. Therefore, it is desirable to perform the undulation correction after the pattern generation when the LED light source is used.

As described above, the difference in the light source between the LD light source and the LED light source causes a difference in the position to arrange a circuit for implementing a correction process (hereinafter, referred to as a "correcting circuit") relative to a circuit for implementing pattern generation (hereinafter, referred to as a "pattern generating circuit"). That is, when the LD light source is used, it is desirable to provide the correcting circuit ahead of the pattern generating circuit, and when the LED light source is used, it is desirable to provide the correcting circuit following the pattern generating circuit.

That is, in order to construct the optical writing control device supporting both the LD light source and the LED light source, it is necessary to provide the correcting circuit for the LD light source ahead of the pattern generating circuit and to provide the correcting circuit for the LED light source behind the pattern generating circuit. Consequently, a line memory is provided in each of the correcting circuits. However, when the LD light source is connected, the correcting circuit for the LED light source is not used, and when the LED light source is connected, the correcting circuit for the LD light source is not used.

The capacity of the line memory considerably affects the manufacturing cost of the optical writing control device. Thus, from the viewpoint of the manufacturing cost, it is very inefficient to separately install the line memories for the LD light source and the LED light source to support each case in which the corresponding light sources is connected to the optical writing control device even though a skew correction process is common to the both cases.

There is a need to reduce a manufacturing cost by improving an efficiency of designing a circuit used in an optical writing control device capable of supporting different kinds of light sources.

SUMMARY OF THE INVENTION

It is an object of the present invention to at least partially solve the problems in the conventional technology.

A light source control circuit of an optical writing device admits connection of any one of a plurality of different kinds of light sources and forms an electrostatic latent image on a photosensitive element by a connected light source controlled by the light source control circuit. The light source control circuit includes: a pixel data output unit that outputs, based on information of an image to be formed as the electrostatic latent image, pixel data that is information of pixels configuring the image for each of the main scanning lines; a pixel data correcting unit that corrects a skew between the main scanning line of the electrostatic latent image formed by the light source and the photosensitive element and a local deviation of the electrostatic latent image formed by the light source on the main scanning line by acquiring the pixel data and by performing a predetermined process, and outputs pixel data; a pattern generating unit that outputs pixel data for forming a predetermined pattern in an electrostatic latent image to be formed by acquiring the pixel data and by performing a predetermined process; a first light source control unit for causing a first light source, that needs correction of the local deviation of the electrostatic latent image on the main scanning line, to emit light based on pixel data to be input; a second light source control unit for causing a second light source, that does not need correction of the local deviation of the electrostatic latent image on the main scanning line, to emit light based on pixel data to be input; and a switch that switches, based on a setting value, between a first transmission status, in which pixel data output from the pixel data output unit is transmitted to the pixel data correcting unit, the pattern generating unit, and the second light source control unit in this order, and a second transmission status, in which the pixel data is transmitted to the pattern generating unit, the pixel data correcting unit, and the first light source control unit in this order.

An image forming apparatus includes: an optical writing device controlled by the light source control circuit mentioned above.

A control method of a light source control circuit in an optical writing device that admits connection of any one of a plurality of different kinds of light sources and that forms an electrostatic latent image on a photosensitive element by a connected light source controlled by the light source control circuit. The light source control circuit includes a pixel data output unit that outputs, based on information of an image to be formed as the electrostatic latent image, pixel data that is information of pixels configuring the image for each of main scanning lines, a pixel data correcting unit that corrects a skew between main scanning line of the electrostatic latent image formed by the light source and the photosensitive element and a local deviation of the electrostatic latent image formed by the light source on the main scanning line by acquiring the pixel data and by performing a predetermined process, and outputs pixel data, a pattern generating unit that outputs pixel data for forming a predetermined pattern in an electrostatic latent image to be formed by acquiring the pixel data and by performing a predetermined process, a first light source control unit for causing a first light source, that needs correction of the local deviation of the electrostatic latent image on the main scanning line, to emit light based on pixel data to be input, and a second light source control unit for causing a second light source, that does not need correction of the local deviation of the electrostatic latent image on the main scanning line, to emit light based on pixel data to be input. The method includes: switching to switch, based on a setting value, between a first transmission status and a second transmission status, both in which the pixel data is output from the pixel data output unit. The first transmission status is a status in which the pixel data is transmitted to the pixel data correcting unit, the pattern generating unit, and the second light source control unit in this first order, and the second transmission status is a status in which the pixel data is transmitted to the pattern generating unit, the pixel data correcting unit, and the first light source control unit in this second order.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram illustrating an example of a register setting value according to the embodiment;

FIG. 13 is a diagram illustrating an example of a chip error measurement value according to the embodiment;

FIG. 14 is a diagram illustrating a register configuration example according to the embodiment;

FIG. 15 is a diagram illustrating an example of a register setting value according to the embodiment;

FIG. 16 is a diagram illustrating an example of a register setting value according to the embodiment; and FIG. 17 is a diagram illustrating a setting example of a register according to the embodiment.

DETAILED DESCRIPTION OF THE PREFERRED EMBODIMENTS

An embodiment of the present invention will be described in detail below with reference to the accompanying drawings. In the present embodiment, a multi function peripheral (MFP) will be described as an example of an image forming apparatus. The image forming apparatus according to the present embodiment is an electrophotographic MFP, and the gist of the present embodiment is that an optical writing control unit that controls a light source in an optical writing device for forming an electrostatic latent image on a photosensitive element supports both a laser diode (LD) light source and a light emitting diode (LED) light source. The image forming apparatus is not limited to the MFP and may be, for example, a copying machine, a printer, or a facsimile machine.

Figure 1:
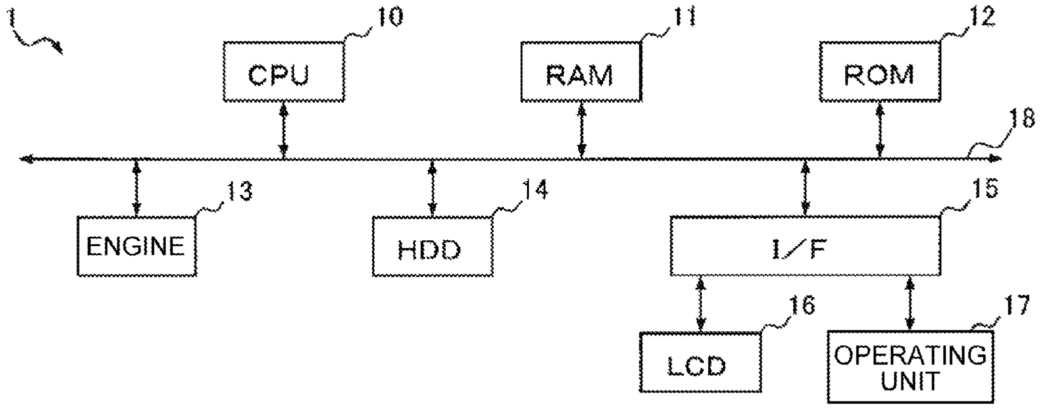
FIG. 1 is a block diagram illustrating a hardware configuration of an image forming apparatus according to an embodiment.

FIG. 1 is a block diagram illustrating a hardware configuration of an image forming apparatus 1 according to the present embodiment. As illustrated in FIG. 1, the image forming apparatus 1 according to the present embodiment includes an engine that performs image formation in addition to a configuration similar to a configuration of a commonly-used server or an information processing terminal such as a personal computer (PC). Specifically, in the image forming apparatus 1 according to the present embodiment, a central processing unit (CPU) 10, a random access memory (RAM) 11, a read only memory (ROM) 12, an engine 13, a hard disk drive (HDD) 14, and an interface (I/F) 15 are connected to one another via a bus 18. In addition, a liquid crystal display (LCD) 16 and an operating unit 17 are connected to the I/F 15.

The CPU 10 is a calculation unit and controls the overall operation of the image forming apparatus 1. The RAM 11 is a volatile storage medium capable of performing high-speed reading and writing on information, and is used as a work area when the CPU 10 processes information. The ROM 12 is a read-only non-volatile storage medium, and stores therein a computer program such as firmware. The engine 13 is a mechanism that actually performs the image formation in the image forming apparatus 1.

The HDD 14 is a non-volatile storage medium capable of reading and writing information and stores therein an operating system (OS), various kinds of control programs, application programs, and the like. The I/F 15 connects and controls the bus 18 and various kinds of hardware, a network, and the like. The LCD 16 is a visual user interface that allows a user to check the status of the image forming apparatus 1. The operating unit 17 is a user interface, such as a keyboard or a mouse, which allows the user to input information to the image forming apparatus 1.

In this hardware configuration, a software control unit is configured by reading a computer program stored in the ROM 12, the HDD 14, or a storage medium such as an optical disk (not shown) to the RAM 11 and performing a calculation according to the computer program by the CPU 10. A functional block for implementing functions of the image forming apparatus 1 according to the present embodiment is configured by a combination of the software control unit configured in this manner and the hardware.

Figure 2:
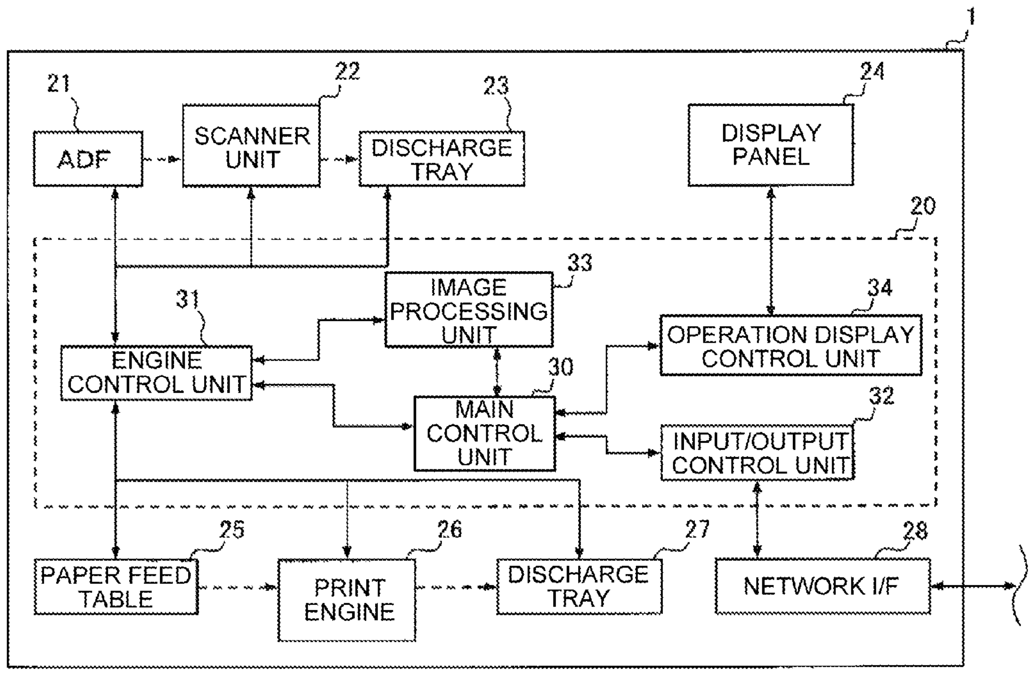
FIG. 2 is a diagram illustrating a functional configuration of the image forming apparatus according to the embodiment.

Next, a functional configuration of the image forming apparatus 1 according to the present embodiment will be described with reference to FIG. 2. FIG. 2 is a block diagram illustrating a functional configuration of the image forming apparatus 1 according to the present embodiment. As illustrated in FIG. 2, the image forming apparatus 1 according to the present embodiment includes a controller 20, an automatic document feeder (ADF) 21, a scanner unit 22, a discharge tray 23, a display panel 24, a paper feed table 25, a print engine 26, a discharge tray 27, and a network I/F 28.

The controller 20 includes a main control unit 30, an engine control unit 31, an input/output control unit 32, an image processing unit 33, and an operation display control unit 34. As illustrated in FIG. 2, the image forming apparatus 1 according to the present embodiment is configured as an MFP including the scanner unit 22 and the print engine 26. In FIG. 2, electrical connections are indicated by solid arrows, and the flow of a sheet is indicated by dashed arrows.

The display panel 24 is an output interface that visually displays the status of the image forming apparatus 1 and also an input interface (an operating unit), implemented as a touch panel that allows the user to directly operate the image forming apparatus 1 or input information to the image forming apparatus 1. The network I/F 28 is an interface that enables the image forming apparatus 1 to communicate with other apparatuses via the network, and the Ethernet (a registered trademark) interface or a universal serial bus (USB) interface is used as the network I/F 28.

The controller 20 is configured by a combination of software and hardware. Specifically, a control program, such as firmware, stored in the ROM 12, a nonvolatile memory, the HDD 14, or a non-volatile recording medium such as an optical disk is loaded into a volatile memory (hereinafter, referred to as a "memory") such as the RAM 11. The controller 20 is configured with the software control unit, which is implemented through calculations performed by the CPU 10 in accordance with the control program, and hardware such as an integrated circuit (IC). The controller 20 functions as a control unit that controls the entire image forming apparatus 1.

The main control unit 30 serves to control each unit included in the controller 20, and gives an instruction to each unit of the controller 20. The engine control unit 31 serves as a drive unit that controls or drives the print engine 26, the scanner unit 22, and the like. The input/output control unit 32 inputs a signal or an instruction via the network I/F 28 to the main control unit 30. The main control unit 30 controls the input/output control unit 32 and accesses other apparatuses via the network I/F 28.

The image processing unit 33 generates drawing information based on print information included in an input print job according to the control by the main control unit 30. The drawing information refers to information for drawing an image to be formed by the print engine 26 serving an image forming unit during an image forming operation. The print information included in the print job refers to image information which is converted into a format recognizable by the image forming apparatus 1 by a printer driver installed in an information processing apparatus, such as a PC. The operation display control unit 34 displays information on the display panel 24 or notifies the main control unit 30 of information input via the display panel 24.

When the image forming apparatus 1 operates as a printer, first, the input/output control unit 32 receives a print job via the network I/F 28. The input/output control unit 32 forwards the received print job to the main control unit 30. Upon receiving the print job, the main control unit 30 controls the image processing unit 33 and causes the image processing unit 33 to generate drawing information based on print information included in the print job.

When the drawing information is generated by the image processing unit 33, the engine control unit 31 forms an image on the sheet conveyed from the paper feed table 25 based on the generated drawing information. That is, the print engine 26 serves as an image forming unit. The sheet on which the image is formed by the print engine 26 is discharged to the discharge tray 27.

When the image forming apparatus 1 operates as a copying machine, the image processing unit 33 generates drawing information based on imaging information received by the engine control unit 31 from the scanner unit 22 or image information generated by the image processing unit 33 based on the imaging information. Similarly to the printer operation, the engine control unit 31 drives the print engine 26 based on the drawing information.

Figure 3:
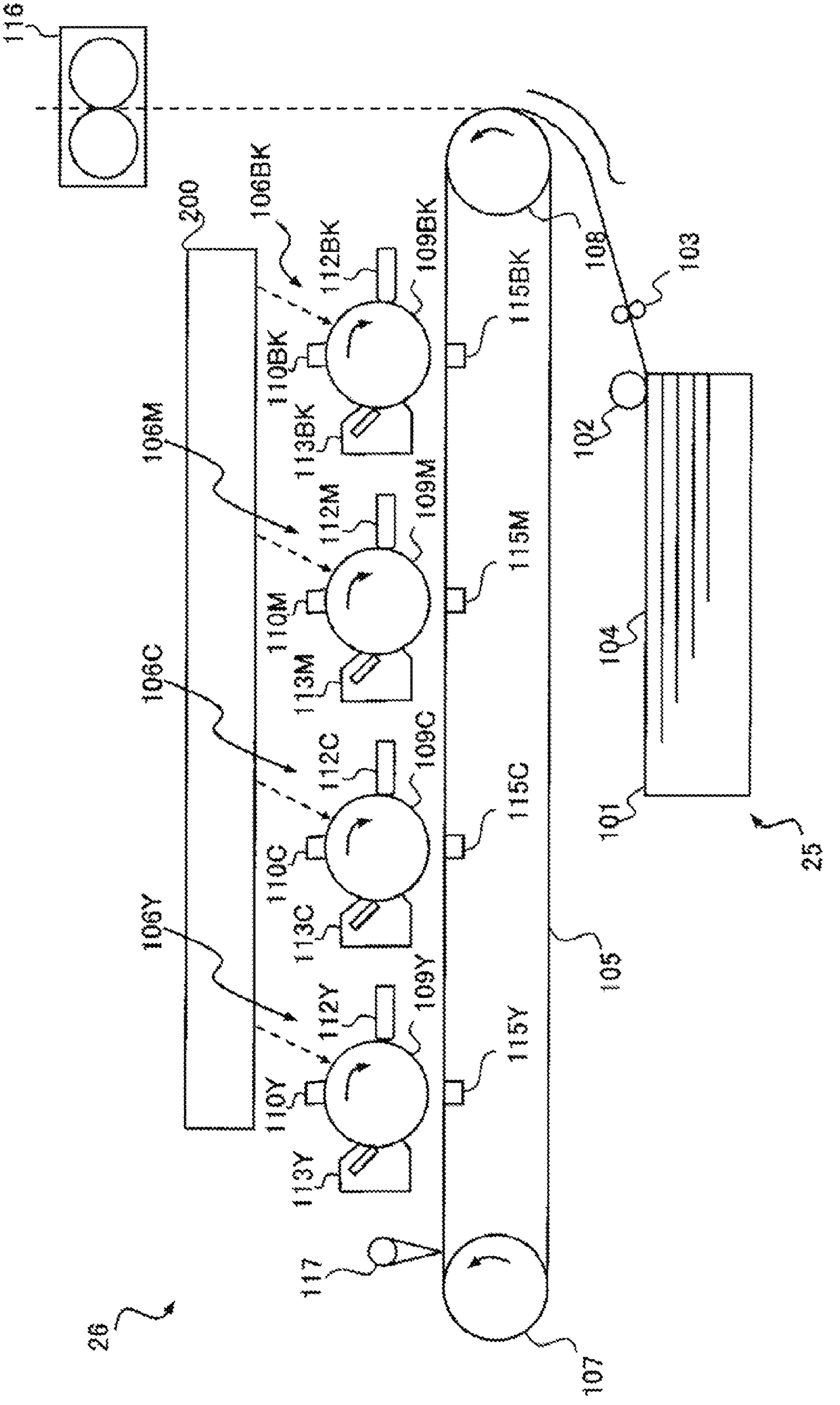
FIG. 3 is a diagram illustrating a configuration of a printer engine according to the embodiment.

Next, a configuration of the print engine 26 according to the present embodiment will be described with reference to FIG. 3. As illustrated in FIG. 3, the print engine 26 according to the present embodiment is so-called a tandem type, having a configuration in which image forming units of respective colors are arranged along a conveying belt 105 that is an endless moving unit. That is, a plurality of image forming units (electrophotographic process units) 106BK, 106M, 106C, and 106Y are arranged, in this order from the upstream side in a conveying direction along the conveying belt 105 that is an intermediate transfer belt on which an intermediate transfer image is formed to be transferred onto a sheet (an example of a recording medium) 104 separated and fed from a paper feed tray 101 by a paper feeding roller 102 and a separating roller 103.

The plurality of image forming units 106BK, 106M, 106C, and 106Y differ from one another only in colors of toner images to be formed and have a common internal configuration. The image forming unit 106BK forms a black image, the image forming unit 106M forms a magenta image, the image forming unit 106C forms a cyan image, and the image forming unit 106Y forms a yellow image. In the following description, the image forming unit 106BK will be described specifically, and because the other image forming units 106M, 106C, and 106Y have the same elements as those of the image forming unit 106BK, the elements of the image forming units 106M, 106C, and 106Y are denoted by reference numerals distinguished by "M", "C", or "Y", respectively, in the drawing in place of "BK" on the labeled elements of the image forming unit 106BK. Thus, the redundant description will not be repeated.

The conveying belt 105 is an endless belt suspended by a driving roller 107, which is rotatably driven, and a driven roller 108. The driving roller 107 is rotatably driven by a driving motor (not shown). The driving motor, the driving roller 107, and the driven roller 108 function as a driving unit that moves the conveying belt 105 which is the endless moving unit.

In image formation, the first image forming unit 106BK transfers a black toner image to the conveying belt 105 that is rotatably driven. The image forming unit 106BK includes a photosensitive element 109BK as a photosensitive body, and a charging unit 110BK, an optical writing device 200, a developing unit 112BK, a photosensitive element cleaner (not shown), an neutralization unit 113BK, and the like, which are arranged around the photosensitive element 109BK. The optical writing device 200 is configured to irradiate the respective photosensitive elements 109BK, 109M, 109C, and 109Y (hereinafter, collectively referred to as a "photosensitive element 109") with light.

In image formation, the outer circumferential surface of the photosensitive element 109BK is uniformly charged by the charging unit 110BK in the dark, then writing on the photosensitive element 109BK is performed by light from a light source corresponding to a black image from the optical writing device 200, and an electrostatic latent image is formed on the photosensitive element 109BK. The developing unit 112BK develops the electrostatic latent image into a visible image using black toner, whereby a black toner image is formed on the photosensitive element 109BK.

The toner image is transferred onto the conveying belt 105 at the position where the photosensitive element 109BK and the conveying belt 105 come into contact with each other or become closest to each other (the transfer position) by an action of a transfer unit 115BK. By this transfer, an image made of black toner is formed on the conveying belt 105. Unnecessary toner remaining on the outer circumferential surface of the photosensitive element 109BK that has been subjected to the transfer of the toner image is removed by the photosensitive element cleaner, the outer circumferential surface of the photosensitive element 109BK is neutralized by the neutralization unit 113BK, and the photosensitive element 109BK keeps on standby for the next image formation.

The black toner image that has been transferred onto the conveying belt 105 by the image forming unit 106BK in the above described way is conveyed to the next image forming unit 106M by roller driving of the conveying belt 105. In the image forming unit 106M, by the same process as the image forming process performed in the image forming unit 106BK, a magenta toner image is formed on the photosensitive element 109M, and the toner image is transferred onto the previously formed black image in a superimposed manner.

The toner images of black toner and magenta toner transferred onto the conveying belt 105 are conveyed to the subsequent image forming units 106C and 106Y. By the similar operations, a cyan toner image formed on the photosensitive element 109C and a yellow toner image formed on the photosensitive element 109Y are transferred onto the previously transferred image in the superimposed manner. Thus, a full-color intermediate transfer image is formed on the conveying belt 105.

The sheets 104 stored in the paper feed tray 101 are fed out sequentially starting from a sheet on top, and the intermediate transfer image formed on the conveying belt 105 is transferred onto the sheet 104 at the position where the feed path comes into contact with or becomes closest to the conveying belt 105. As a result, the image is formed on the sheet 104. The sheet 104 on which the image is formed is further conveyed, the image has been fixed by a fixing unit 116, and the sheet 104 is discharged to the outside of the image forming apparatus 1.

In the image forming apparatus 1, due to an error in the inter-shaft distance between the photosensitive elements 109BK, 109M, 109C, and 109Y, an error in parallelism of the photosensitive elements 109BK, 109M, 109C, and 109Y, an assembly error of the deflecting mirror in the optical writing device 200, an error in timing of writing the electrostatic latent image on the photosensitive elements 109BK, 109M, 109C, and 109Y, or the like, the toner images of respective colors are not superimposed on each other at the position where they should be superimposed on each other, causing a positional deviation in respective colors.

Further, due to a similar cause, the image may be transferred onto a sheet, serving as a transfer target, in a range which has strayed from the range in which the image should have been transferred. Known elements of the positional deviation are such as a skew, misregistration in the sub-scanning direction, a magnification ratio error in the main scanning direction, and misregistration in the main scanning direction. In addition, known errors are found in the rotation speed of the conveying roller for conveying the sheet, an error in a conveyance amount caused by abrasion of the conveying roller, and the like.

A pattern detecting sensor 117 is provided so as to correct the positional deviation. The pattern detecting sensor 117 is an optical sensor for reading a positional deviation correction pattern transferred onto the conveying belt 105 by the photosensitive elements 109BK, 109M, 109C, and 109Y. The pattern detecting sensor 117 includes an optical element for emitting light to a correction pattern drawn on the surface of the conveying belt 105 and an optical element for receiving light reflected from the correction pattern. As illustrated in FIG. 3, the pattern detecting sensor 117 is supported on the same substrate in a downward direction perpendicular to the conveying direction of the conveying belt 105 on the downstream side of the photosensitive elements 109BK, 109M, 109C, and 109Y.

Next, a description will be given of the optical writing device 200 according to the present embodiment. As described above, the LD light source or the LED light source may be selectively employed as the optical writing device 200 according to the present embodiment. First, a description will be given of the LD light source.

Figure 4:
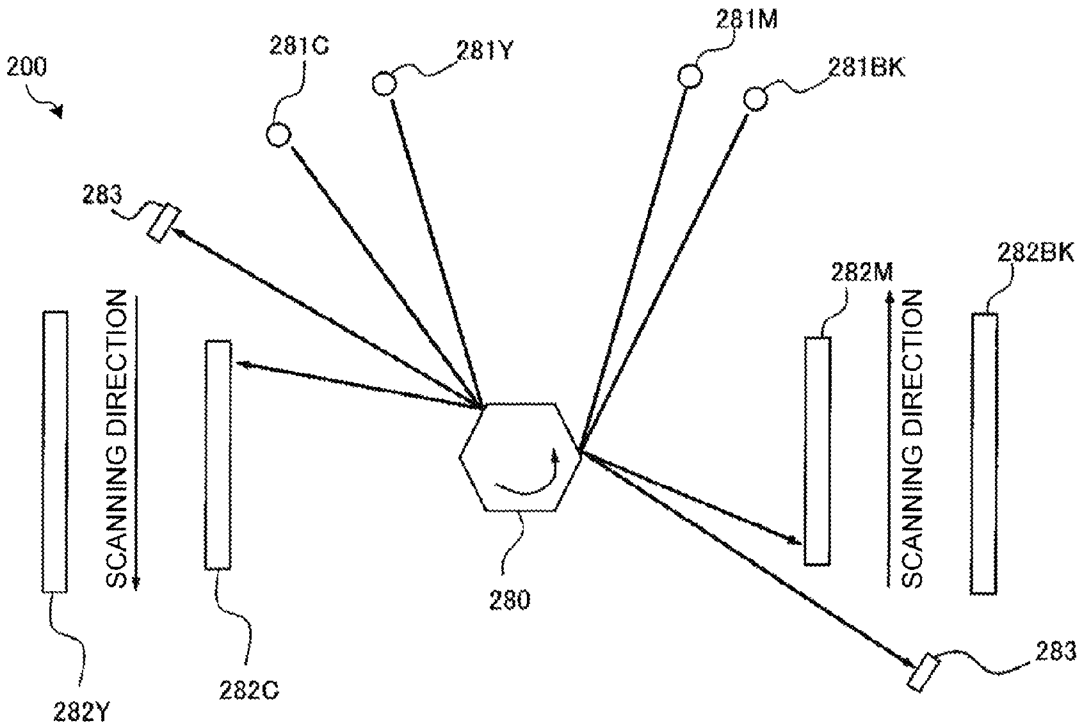
FIG. 4 is a top view illustrating a configuration of an optical writing device according to the embodiment.
Figure 5:
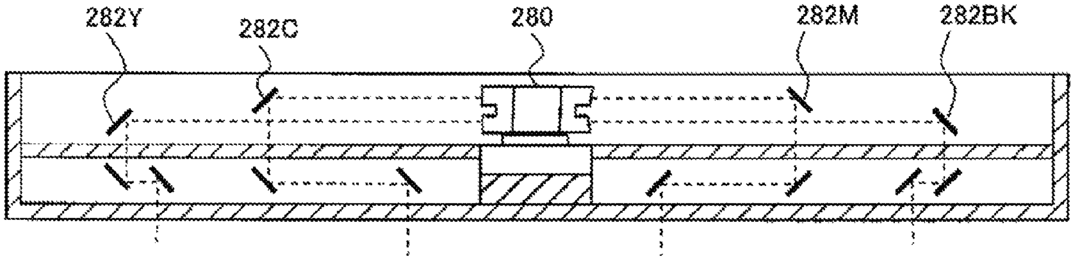
FIG. 5 is a cross-sectional side view illustrating a configuration of the optical writing device according to the embodiment.

FIG. 4 is a top view of the optical writing device 200 according to the present embodiment. FIG. 5 is a cross-sectional side view of the optical writing device 200 according to the present embodiment. As illustrated in FIGS. 4 and 5, laser beams for performing writing on the photosensitive elements 109BK, 109M, 109C, and 109Y of respective colors are emitted from LD light source devices 281BK, 281M, 281C, and 281Y (hereinafter, collectively referred to as a "LD light source device 281") which are the LD light sources. The LD light source device 281 according to the present embodiment includes a semiconductor laser, a collimator lens, a slit, a prism, a cylinder lens, and the like.

The laser beams emitted from the LD light source device 281 are reflected by a reflecting mirror 280. The laser beams are guided to mirrors 282BK, 282M, 282C, and 282Y (hereinafter, collectively referred to as a "mirror 282") by an optical system such as an fθ lens (not shown), respectively, and then the surfaces of the photosensitive elements 109BK, 109M, 109C, and 109Y are scanned with the laser beams by the optical systems provided in a subsequent portion. That is, the reflecting mirror 280 and the mirror 282 function as a scanning unit.

The reflecting mirror 280 includes a hexahedral polygon mirror. The reflecting mirror 280 can perform scanning with a laser beam corresponding to one line in the main scanning direction by respective surfaces of the polygon mirror through rotation. A horizontal synchronization detecting sensor 283 is provided near a scanning start position of a range scanned with the laser beam by the reflecting mirror 280. When the laser beam from the LD light source device 281 is incident on the horizontal synchronization detecting sensor 283, timing of the scanning start position of a main scanning line is detected, and a control device for controlling the LD light source device 281 is synchronized with the reflecting mirror 280.

Figure 6:
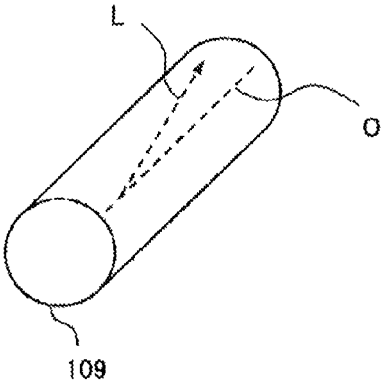
FIG. 6 is a diagram illustrating a skew of a main scanning line in the optical writing device according to the embodiment.

FIG. 6 is a diagram illustrating the skew of a main scanning line occurring in the optical writing device 200 of the LD light source illustrated in FIGS. 4 and 5. In order to form an image without a skew, the trajectory of a beam emitted from a light source needs to be parallel to the rotating shaft of the photosensitive element indicated by "O" in FIG. 6. However, due to an assembly error of the polygon mirror, an assembly error of the LD light source device 281, or an irregular rotation of the photosensitive element 109, or a variation in a surface diameter of the photosensitive element 109, the beam trajectory may be skewed as indicated by L in FIG. 6. A process of correcting the skew of the beam trajectory is referred to as a skew correction process in the optical writing device 200 using the LD light source.

Figure 7:
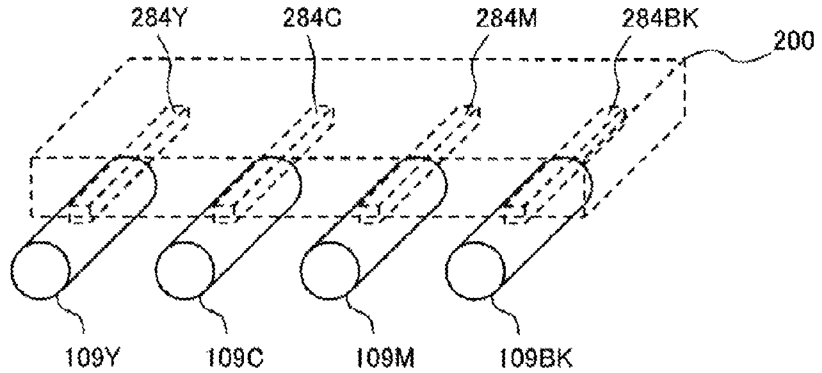
FIG. 7 is a perspective view illustrating a configuration of the optical writing device according to the embodiment.

Next, a description will be given of the optical writing device 200 using the LED light source. FIG. 7 is a diagram illustrating an arrangement relation between the optical writing device 200 including the LED light source and the photosensitive element 109 according to the present embodiment. As illustrated in FIG. 7, light for irradiating the photosensitive elements 109BK, 109M, 109C, and 109Y of respective colors is emitted from an array of LEDs (LEDA) 284BK, 284M, 284C, and 284Y (hereinafter, collectively referred to as an "LEDA 284"), which are light sources.

The LEDA 284 is configured such that LEDs as light emitting elements are arranged in the main scanning direction of the photosensitive element 109. An optical writing control device included in the optical writing device 200 controls the on/off status of each of the LEDs arranged in the main scanning direction based on data of an image to output, for each of the main scanning lines, and selectively exposes the surface of the photosensitive element 109 to light to thereby form an electrostatic latent image. That is, the LEDA 284 forms an electrostatic latent image corresponding to one line of an image to output in the main scanning direction by performing one cycle of the on/off control.

Figure 8:
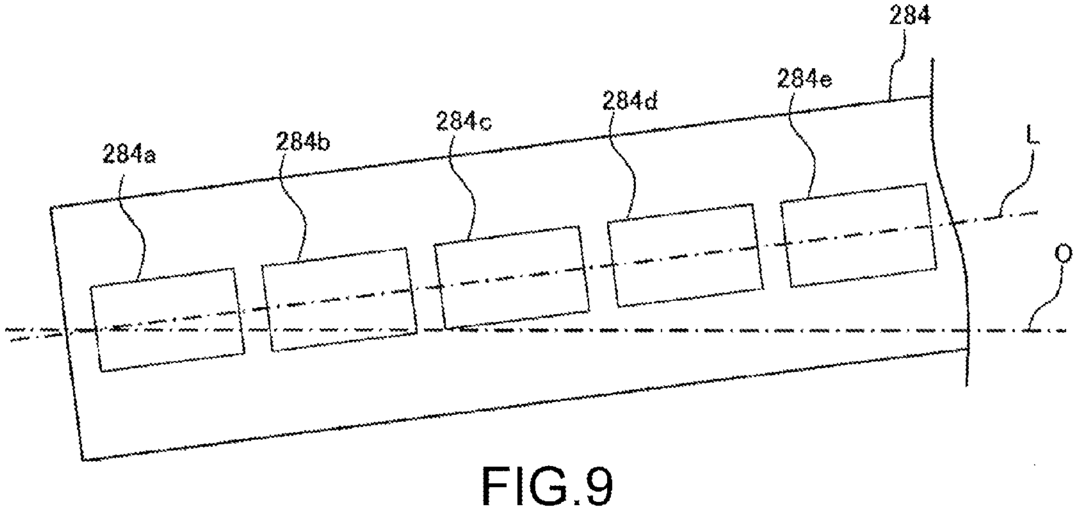
FIG. 8 is a diagram illustrating a skew of a main scanning line in the optical writing device according to the embodiment.

Next, a description will be made in connection with correction necessary in the optical writing device 200 employing the LED light source. FIG. 8 is a diagram illustrating the skew of the LEDA 284. As illustrated in FIG. 8, the LEDA 284 includes a plurality of light source chips 284*a*, 284*b*, 284*c*, 284*d*, 284*e*, and the like mounted on a substrate. The substrate is a supporting board for supporting the plurality of light source chips 284*a*, 284*b*, 284*c*, and the like. The plurality of light source chips 284*a*, 284*b*, 284*c*, and the like are mounted on the substrate that is further mounted on the optical writing device 200. The main scanning direction is the direction along which the plurality of light source chips 284*a*, 284*b*, 284*c*, and the like are arranged.

The plurality of light source chips 284*a*, 284*b*, 284*c*, and the like are integrated semiconductor chips, each of which includes a plurality of LED elements or light emitting elements as light sources. That is, the plurality of light source chips 284*a*, 284*b*, 284*c*, and the like are a light emitting element assembly. The plurality of LED elements installed in each of the plurality of light source chips 284*a*, 284*b*, 284*c*, and the like are also arranged in the main scanning direction. Each of the light source chips 284*a*, 284*b*, 284*c*, and the like according to the present embodiment includes 192 LED elements, that is, LED elements corresponding to 192 dots in the main scanning direction. The LEDA 284 according to the present embodiment includes 26 light source chips 284*a*, 284*b*, 284*c*, and the like arranged in the main scanning direction. The resolution of the LEDA 284 according to the present embodiment is 2400 dots per inch (dpi).

As illustrated in FIG. 8, in the optical writing device 200 employing the LEDA 284, an assembly error of the LEDA 284 causes a so-called skew in which a skewed image is generated. In the example of FIG. 8, a direction parallel to the rotating shaft of the photosensitive element 109 is indicated by a dashed-dotted line "O", but the LEDA 284 is arranged to be skewed as indicated by a dashed-dotted line "L".

Because the electrostatic latent image is formed such that the photosensitive element 109 is exposed to light from the LEDA 284, when a direction in which the LEDs are arranged in the LEDA 284 is skewed with respect to the main scanning direction of the photosensitive element 109, the electrostatic latent image is also skewed corresponding to the amount of the skew. Then, the electrostatic latent image is developed into a skewed image. A correction process performed to prevent the occurrence of the skew is a skew correction process in the optical writing device 200 including the LEDA 284.

Figure 9:
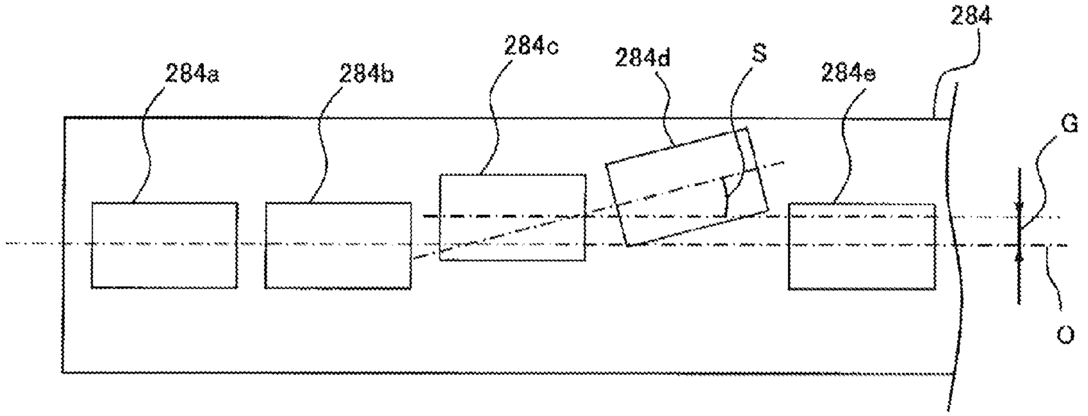
FIG. 9 is a diagram illustrating a chip error in an LEDA of the optical writing device according to the embodiment.

Next, the LEDA 284 which has a positional deviation among the light source chips 284*a*, 284*b*, 284*c*, and the like is illustrated in FIG. 9. In the example of FIG. 9, the light source chips 284*a*, 284*b*, and 284*e* are mounted in an ideal state. However, the light source chip 284*c* is shifted from the ideal state by a width G, and the light source chip 284*d* is further shifted from the ideal state and skewed by an angle S. Manufacturing tolerance illustrated in FIG. 9 may occur in the process of manufacturing the LEDA 284.

When image formation output is performed without considering the chip assembly error illustrated in FIG. 9, an image formed according to the chip assembly error is deviated, and image disturbance, such as a vertical stripe, that is, a stripe in the sub-scanning direction, appears in an output image. Hereinafter, such an image disturbance is referred to as an "undulation". In order to avoid the undulation, a process of correcting the assembly error based on information representing the chip assembly error illustrated in FIG. 9 and then executing an image formation output is referred to as an undulation correction process in the optical writing device 200 including the LEDA 284.

In the image forming apparatus 1 including the optical writing device 200, the gist of the present embodiment lies in that the optical writing control device is configured to be capable of performing appropriate image formation output even when any one of the LD light source and the LED light source is connected. The optical writing control device according to the present embodiment will be described below.

Figure 10:
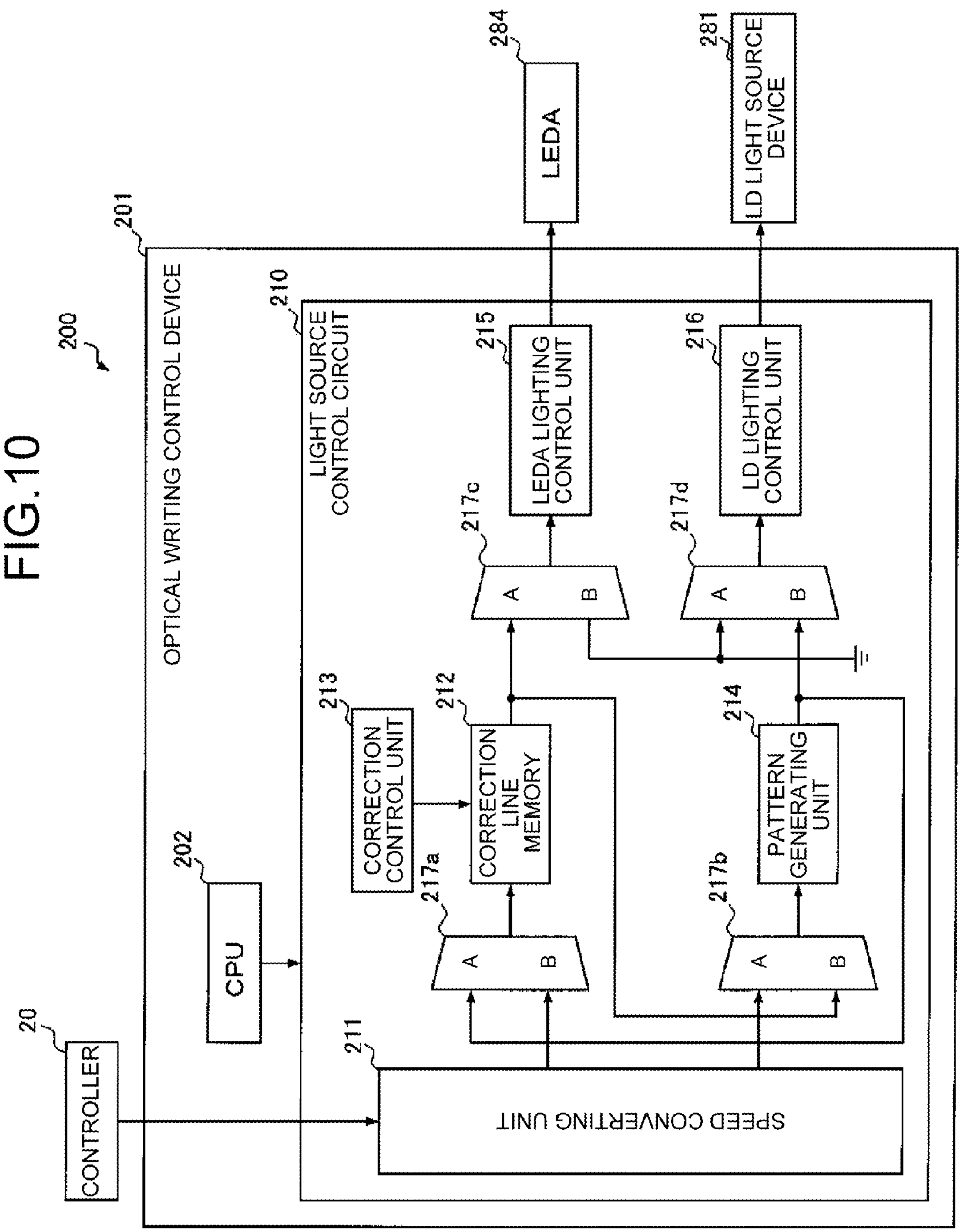
FIG. 10 is a block diagram illustrating a configuration of an optical writing control device according to the embodiment.

FIG. 10 is a block diagram illustrating a configuration of an optical writing control device 201 according to the present embodiment and connection relations with the controller 20, the LEDA 284, and the LD light source device 281. As illustrated in FIG. 10, the optical writing device 200 is configured with the optical writing control device 201 and one of the light sources between the LD light source device 281 and the LEDA 284. In FIG. 10, for clarifying the connection relations, both the LD light source device 281 and the LEDA 284 are illustrated. However, only one of the LD light source device 281 and the LEDA 284 is actually connected to the optical writing control device 201.

The optical writing control device 201 includes a CPU 202 that functions as a control unit and a light source control circuit 210 that actually performs signal processing. Here, a configuration such as the RAM 11, the ROM 12, or the like, which have been described with reference to FIG. 1, may be appropriately included in the optical writing control device 201 for the operation of the CPU 202. As illustrated in FIG. 10, the light source control circuit 210 includes a speed transforming unit 211, a correction line memory 212, a correction control unit 213, a pattern generating unit 214, an LEDA lighting control unit 215, an LD lighting control unit 216, and switches 217*a*, 217*b*, 217*c*, and 217*d*.

The speed transforming unit 211 functions as a pixel data output unit that performs frequency transformation on image data for image formation output to be input from the engine control unit 31 of the controller 20 and sequentially outputs pixel data, which is the information of pixels configuring an image, for each of the main scanning lines according to a predetermined frequency. The pixel data output from the speed transforming unit 211 is input to the switch 217*a* that switches an input to the correction line memory 212 and to the switch 217*b* that switches an input to the pattern generating unit 214.

The switches 217*a* to 217*d* according to the present embodiment perform the switching operation according to a control signal input from the CPU 202. In the switches 217*a* to 217*d*, the same input terminals are selected as input terminals of "A" and "B" illustrated in FIG. 10. Here, "B" is selected as the input terminals of the switches when the LD light source device 281 is connected to the optical writing control device 201, whereas "A" is selected as the input terminals of the switches when the LEDA 284 is connected to the optical writing control device 201.

The correction line memory 212 stores pixel data of a plurality of lines output from the switch 217*a* in each of the main scanning lines. Then, the correction line memory 212 outputs pixel data that have been stored in each of the main scanning lines, for each of the main scanning lines according to the controls of the correction control unit 213. The correction line memory 212 shifts the main scanning line in the sub-scanning direction at a predetermined position, on the main scanning line, from which pixel data is output according to the control by the correction control unit 213. Thus, the correction line memory 212 functions as a pixel data correcting unit that executes skew correction and undulation correction. The pixel data output from the correction line memory 212 is input to the switches 217*b* and 217*c*.

The correction control unit 213 shifts the main scanning line of pixel data output from the correction line memory 212 in the sub-scanning direction according to a register value input from the CPU 202, as described above. The details of the correction process performed by the correction line memory 212 and the correction control unit 213 will be described later.

The pattern generating unit 214 functions as an image processing unit that generates a MUSIC pattern for color correction, a process control pattern for process control, a security pattern for forgery prevention, and the like. Specifically, when any one of the aforementioned patterns is formed and output as an image, the pattern generating unit 214 converts pixel data input from the switch 217*b* into pixel data configuring the pattern, and outputs the pixel data configuring the pattern. The pixel data output from the pattern generating unit 214 is input to the switches 217*a* and 217*d* according to a register value input from the CPU 202.

In the case of the security pattern, the above described pixel conversion is performed in such a way that the pattern is superimposed on an original image that is to be subjected to image formation output. However, in the case of the MUSIC pattern or the process control pattern, there is no original image to be output. In this case, the pattern generating unit 214 generates pixel data for configuring the pattern, based on null pixel data, according to a register value input from the CPU 202.

The LEDA lighting control unit 215 causes the LEDA 284 to emit light based on pixel data input from the switch 217*c*. The LD lighting control unit 216 causes the LD light source device 281 to emit light based on pixel data input from the switch 217*d*. That is, the LEDA lighting control unit 215 and the LD lighting control unit 216 function as the light source control units.

The switch 217*a* switches a source for inputting pixel data to the correction line memory 212 between the speed transforming unit 211 and the pattern generating unit 214 according to a register value input from the CPU 202. The switch 217*b* switches a source for inputting pixel data to the pattern generating unit 214 between the speed transforming unit 211 and the correction line memory 212 according to a register value input from the CPU 202.

The switch 217*c* switches pixel data output from the correction line memory 212 to be input to the LEDA lighting control unit 215 according to a register value input from the CPU 202. The switch 217*d* switches pixel data output from the pattern generating unit 214 to be input to the LD lighting control unit 216 according to a register value input from the CPU 202. Here, one of input terminals of each of the switches 217*c* and 217*d* is connected to a system ground. Accordingly, when the switch 217*c* (or 217*d*) does not output pixel data output from the correction line memory 212 (or the pattern generating unit 214), a signal corresponding to the system ground is output as an output signal of the switches 217*c* (or 217*d*).

Next, a description will be made in connection with the switching operation of the switches 217*a* to 217*d* in the light source control circuit 210 according to the present embodiment. As described above, the switches 217*a* to 217*d* are caused to perform switching operation by a register value input from the CPU 202, and the register value is set according to the connected light source. Accordingly, switching operation is made for switching between the correction line memory 212 and the pattern generating unit 214 that is to be passed through by pixel data first and also for switching between the LEDA lighting control unit 215 and the LD lighting control unit 216 that pixel data is to be input to.

Figure 11A:
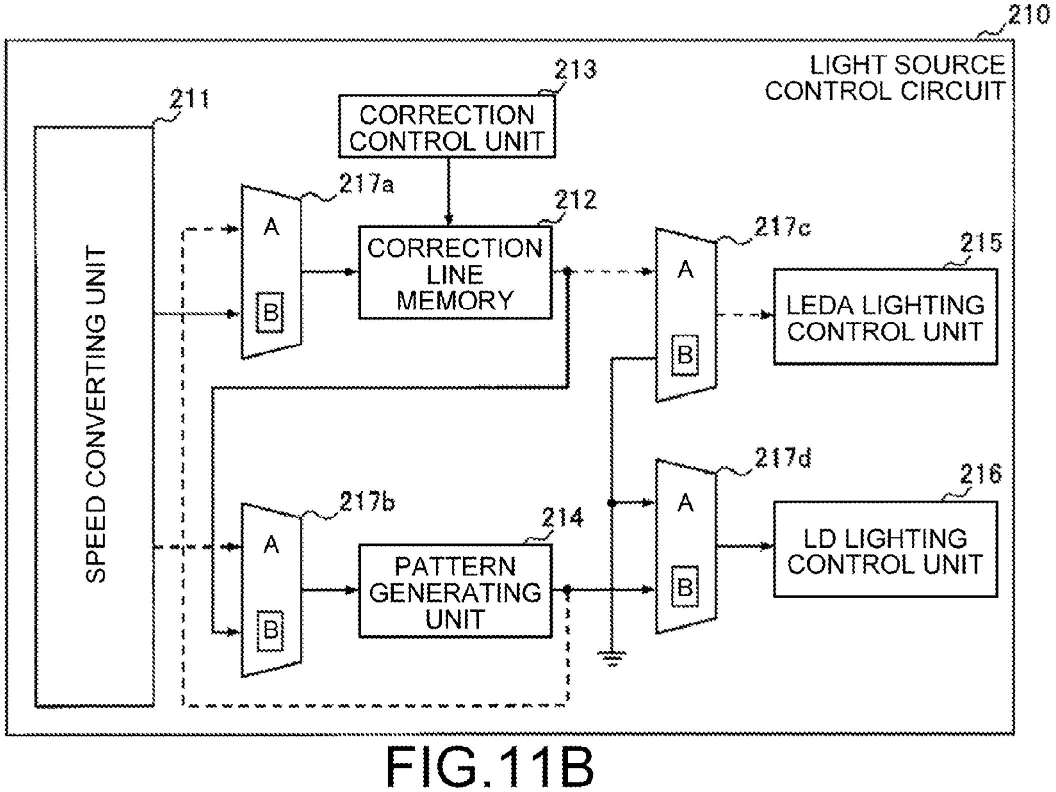
FIGS. 11A and 11B are diagrams illustrating a switching operation performed by switches of a light source control circuit according to the embodiment.
Figure 11B:
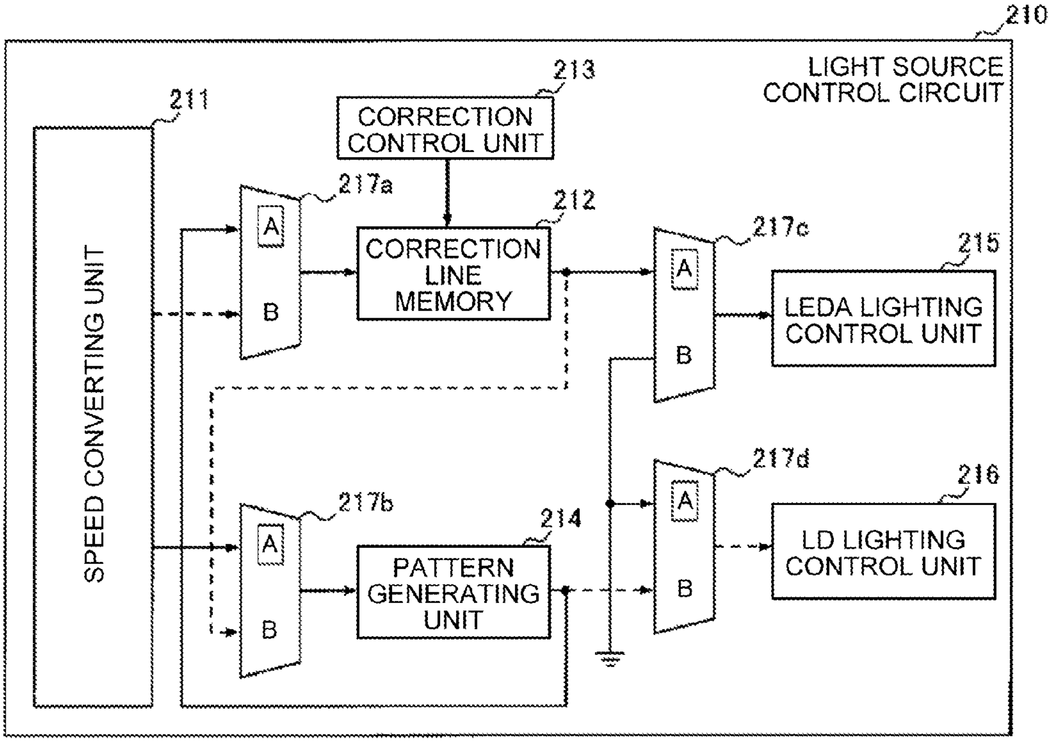

FIGS. 11A and 11B illustrate switching statuses of the light source control circuit, that is, transmission statuses of pixel data according to the present embodiment. FIG. 11A is a diagram illustrating a switching status when "B" is selected as an input terminal of the switch, that is, a switching status when the LD light source device 281 is connected as the light source. In FIG. 11A, the flow of an invalidated signal is indicated by a dashed line. As illustrated in FIG. 11A, when the LD light source device 281 is connected, pixel data output from the speed transforming unit 211 is input to the correction line memory 212 through the switch 217*a*.

The pixel data, which is input to the correction line memory 212 and stored in each of the main scanning lines, is read for each of the main scanning lines according to the controls by the correction control unit 213, and output after being shifted, based on a register value set to the correction control unit 213, in the sub-scanning direction at a predetermined position on the main scanning line.

Here, a description will be given of skew correction of pixel data when the LD light source device 281 is connected, as illustrated in FIG. 11A, that is, when the skew correction is performed by the correction line memory 212 and the correction control unit 213. When the LD light source device 281 is connected as the light source, skew correction for correcting the skew of the beam trajectory is executed as described with reference to FIG. 6.

Suppose that the skew of the beam trajectory illustrated in FIG. 6 causes deviation, for example, with an amount corresponding to 5 pixels in the sub-scanning direction between a pixel arranged at one end of one main scanning line and another pixel arranged at the other end thereof. In this case, in the skew correction process for the LD light source device 281 according to the present embodiment, deviation in the sub-scanning direction is corrected by shifting the pixels in the sub-scanning direction at 5 positions on the main scanning line. To this end, in the case of FIG. 11A, a register value illustrated in FIG. 12 is set in the correction control unit 213.

In the case of FIG. 11A, a register value set in the correction control unit 213 includes a "shift position on main scanning line" and a "shift direction" as illustrated in FIG. 12. The "shift position on main scanning line" refers to a value representing the position at which pixel data output from the correction line memory 212 is to be shifted in the sub-scanning direction by one line, that is, the position to shift on the main scanning line, using the number of pixels on the main scanning line. The shift direction refers to a value representing a direction to shift the main scanning line from which pixel data, that is to be output, is read.

To set the register value, the correction control unit 213 counts pixel data output from the correction line memory 212 pixel by pixel, and when the count value coincides with a pixel designated by the "shift position on main scanning line", the main scanning line from which pixel data is read is shifted by one line in a direction set as the "shift direction". Through this process, skew correction for the connection of the LD light source device 281 is executed.

The skew correction register value set as illustrated in FIG. 12 is not a predetermined value but a value which is calculated based on the result of reading a skew correction pattern, for example, formed on the photosensitive element 109BK among a plurality of photosensitive elements 109 by using the pattern detecting sensor 117.

The pixel data output from the correction line memory 212 is input to the pattern generating unit 214 through the switch 217*b*. The pattern generating unit 214 converts pixel data according to a pattern to be formed and outputs the converted pixel data as described above. The pixel data output from the pattern generating unit 214 is input to the LD lighting control unit 216 through the switch 217*d*. The LD lighting control unit 216 causes the LD light source device 281 to emit light according to the input pixel data.

As described above, in the skew correction process when the LD light source device 281 is connected, an image is shifted at the shift position set on the main scanning line by one line, that is, by one pixel in the sub-scanning direction. When the whole image is viewed, the visual influence of the change is not so large. However, when a pattern generated by the pattern generating unit 214 is a pattern, which has a specific arrangement of pixels to be read later, such as a digital watermark, even a deviation of one pixel may influence the degree of accuracy in the subsequent reading.

By contrast, when the LD light source device 281 is connected as the light source, the pixel data output from the speed transforming unit 211 is first subjected to skew correction by the correction line memory 212 before being input to the pattern generating unit 214. Thus, the pattern generated by the pattern generating unit 214 is not caused to collapse by the shifting of the main scanning line in the skew correction, and thus the above mentioned adverse effect can be avoided.

The skew correction process that is needed when the LD light source device 281 is connected as the light source is the skew correction process for the entire image, as described above with reference to FIG. 6. Thus, because the image is not locally deviated, even though the pattern generated by the pattern generating unit 214 is not subjected to skew correction, the pattern can be read later.

FIG. 11B is a diagram illustrating a switching status when "A" is selected as the input terminals of the switches, that is, a switching status when the LEDA 284 is connected as the light source. In FIG. 11B, the flow of an invalidated signal is indicated by a dashed line. As illustrated in FIG. 11B, when the LEDA 284 is connected, the pixel data output from the speed transforming unit 211 is input to the pattern generating unit 214 through the switch 217*b*.

The pixel data input to the pattern generating unit 214 is converted according to a pattern to be formed, and output, similarly to the case of FIG. 11A. The pixel data output from the pattern generating unit 214 is input to the correction line memory 212 through the switch 217*a*. The pixel data, which is input to the correction line memory 212 and stored in each of the main scanning lines, is read from each of the main scanning lines according to the control by the correction control unit 213, then shifted in the sub-scanning direction at a predetermined position on the main scanning line based on a register value set in the correction control unit 213, and output.

Here, a description will be made on the skew correction and undulation correction of pixel data by the correction line memory 212 and the correction control unit 213 when the LEDA 284 is connected, as illustrated in FIG. 11B. When the LEDA 284 is connected as the light source, the skew correction for correcting the skew of the LEDA 284 with respect to the photosensitive element 109 and the undulation correction for correcting the assembly error of the light source chips 284*a*, 284*b*, 284*c*, and the like included in the LEDA 284 are performed as described with reference to FIGS. 8 and 9.

In the case of FIG. 11B, similarly to FIG. 11A, correction is performed by shifting the main scanning line at each position on the main scanning line. When the LEDA 284 is connected as the light source, a circuit subsequent to the correction line memory 212 increases the resolution in the sub-scanning direction by N times by increasing the frequency of pixel data, which has been subjected to frequency transform by the speed transforming unit 211, by N times, that is, by increasing the frequency by an integer multiple, and reading pixel data stored in the correction line memory 212 N times for each of the main scanning lines. That is, one main scanning line is divided into N pieces, and then optical writing is executed by the LEDA 284. Thus, in the correction by the correction line memory 212 and the correction control unit 213 when the LEDA 284 is connected, the main scanning line can be shifted by 1/N line.

As described above with reference to FIG. 9, the undulation refers to a local collapse of an image on the main scanning line, which occurs due to the assembly error of the light source chips in the LEDA 284. In addition, the deviation with the amount of one pixel or less frequently occurs. Thus, by allowing a shift by 1/N of a line, the appropriate correction can be performed. The content of the undulation is the manufacturing tolerance of the LEDA 284 and varies for each of the LEDA 284. Thus, the register value for the undulation correction is a value generated based on the assembly error of the light source chips measured in the fabrication step of the LEDA 284.

FIG. 13 is a diagram illustrating an example of a measurement result of the assembly error. As illustrated in FIG. 13, in a measurement result of the assembly error of the chip (hereinafter, referred to as a "chip error measurement value") according to the present embodiment, positional deviation amounts of a 1st dot and a 97-th dot, among LED elements included in each of the light source chips, in the sub-scanning direction are stored as correction values.

As illustrated in FIG. 13, in the chip error measurement value according to the present embodiment, positions of a light source chip arranged at one end in the main scanning direction and another light source chip arranged at the other end, that is, the positions of a 1st dot of a first chip and a 97-th dot of a 26-th chip in FIG. 13, are connected with each other by a straight line, and positional deviation amounts in a direction perpendicular to the straight line are represented as positional deviation amounts of the LED elements. In addition, in the chip error measurement value according to the present embodiment, the positional deviation amounts of the LED elements from the straight line are represented by a value converted into a pitch number (one pitch is 10.6 μm) at 2400 dots per inch (dpi).

FIG. 13 illustrates the chip error measurement value corresponding to the example of FIG. 9. Positional deviation does not occur in the first chip or second chip as illustrated in FIG. 9. In the third chip, deviation by 3 dots has occurred in the first dot and the 97-th dot, and the whole chip remains shifted similarly to the light source chip 284*c* in FIG. 9. In the fourth chip, a 1st dot and a 97-th dot differ in the deviation amount to indicate that the chip is skewed similarly to the light source chip 284*d* in FIG. 9.

Next, a description will be given on a configuration of a register value to be input to the correction control unit 213 when the LEDA 284 is connected. FIG. 14 is a diagram illustrating a configuration of a register value to be input to the correction control unit 213 when the LEDA 284 is connected. In the case of FIG. 11B, a register value for correcting the position of the LED elements included in the LEDA 284 in the sub-scanning direction is set at intervals of 24 dots in the main scanning direction as illustrated in FIG. 14.

As illustrated in FIG. 14, the bit length of the register is basically 2 bits. However, the bit length of the register value is set to 4 bits at intervals of 192 dots, that is, the bit length of the register value corresponding to the LED element arranged at an end portion of each of the light source chips 284*a*, 284*b*, 284*c*, and the like, is set to 4 bits. In the present embodiment, the register value is set as in FIG. 14 for each of the LEDA 284BK, the LEDA 284M, the LEDA 284C, and the LEDA 284Y, that is, for pixel data of each color.

Next, a setting value of a register input to the correction control unit 213 when the LEDA 284 is connected will be described with reference to FIGS. 15 and 16. FIG. 15 is a diagram illustrating the content of a setting value of a register, among the registers illustrated in FIG. 14, whose bit length is two bits. As illustrated in FIG. 15, one of the two bits represents whether or not the position of a corresponding dot is to be corrected. The remaining bit represents whether line shifting is to be performed in a positive direction or a negative direction when the position of the corresponding dot is corrected. The positive direction and the negative direction refer to positive sub-scanning direction and negative sub-scanning direction, respectively. The line does not refer to one of the main scanning lines of original pixel data but to a line obtained after the main scanning has been divided.

FIG. 16 is a diagram illustrating the content of setting values of a register, among the registers illustrated in FIG. 14, whose bit length is four bits. As illustrated in FIG. 16, one of the four bits represents, similarly to FIG. 15, whether or not the position of a corresponding dot is to be corrected. The remaining three bits represent any one among 1 to 4 lines in the positive direction and 1 to 4 lines in the negative direction as correction amounts, that is, shift amounts in the sub-scanning direction when the position of the corresponding dot is corrected.

In the case of FIG. 11B, the correction control unit 213 applies the register value to be input in the order in the main scanning direction, to the dots starting from the first dot. For example, when a correction value representing "shifting by one dot in the positive direction" is stored as a correction value of a register No. 2 illustrated in FIG. 14, that is, a correction value of a 25-th dot, the correction value is applied to all the subsequent dots. Accordingly, when a correction value of a register No. 3 representing a 49-th dot indicates "no correction," the 49-th dot is shifted by one line similarly to the 25-th dot. However, when the correction value of the 49-th dot represents "shifting by one dot in the negative direction," the correction amount of the 49-th dot becomes zero in the positive or negative direction. Further, when the correction value of the 49-th dot represents "shifting by one dot in the positive direction," the correction amount of the 49-th dot corresponds to shifting of a total of 2 dots in the positive direction.

FIG. 17 illustrates an example in which register values input to the correction control unit 213 of FIG. 11B are made to correspond to the chip error measurement value described with reference to FIG. 13. In the example of FIG. 17, the chip error measurement value of FIG. 13 has been applied "as is" under the assumption that there is no skew in the LEDA 284.

As illustrated in FIG. 17, a value representing "no position correction" is set as the register values corresponding to the light source chips 284*a* and 284*b*. At timing when the process for setting a register value is shifted to the light source chip 284*c*, that is, at the light source chip 284*c*, a value representing "shifting by 3 lines in the negative direction" is set as a register value of an LED element arranged at the end portion on the side of the light source chip 284*b*. As illustrated in FIG. 9, because the light source chip 284*c* is shifted but not skewed, a value representing "no position correction" is set as register values corresponding to the remaining LED elements included in the light source chip 284*c*.

After the process for setting a register value is shifted from the light source chip 284*c* to the light source chip 284*d*, a correction value for correcting the skew of the light source chip 284*d* illustrated in FIG. 9 is set as register values of the LED elements included in the light source chip 284*d*. As described above, correction of substantially 5 or more lines is performed between the light source chip 284*a* and the light source chip 284*d*. However, through the above described configuration, the bit length of the register can be reduced, and thus the circuit size can be reduced.

In the case of FIG. 11B, similarly to the case of FIG. 11A, the correction control unit 213 counts pixel data output from the correction line memory 212 pixel by pixel, and each time when the count value reaches 24, the correction line memory 212 refers to each register setting value and shifts the main scanning line from which pixel data is read according to the setting value. In the case of FIG. 17, the correction line memory 212 reads dot data of the main scanning line of a correction target from a 1st dot to a 384-th dot and outputs the read dot data without performing position correction on the first dot to the 384-th dot.

Then, when dot data of a 389-th dot is read, the correction line memory 212 reads dot data obtained by shifting by 3 dots in the negative direction according to the control of the correction control unit 213. Thereafter, the correction line memory 212 successively reads dot data obtained by shifting 3 dots each time from a 390-th dot to a 576-th dot. As a result, the shift of the light source chip 284*c* illustrated in FIG. 9 is corrected.

Further, the correction line memory 212 gradually shifts dot data to be read from a 577-th dot to a 768-th dot according to the control of the correction control unit 213. As a result, the skew of the light source chip 284*d* illustrated in FIG. 9 is corrected. Through the above described process, a skew correction process for the connection of the LEDA 284 is performed.

In FIG. 17, the setting values of the correction corresponding only to the chip error illustrated in FIG. 9 have been described as an example. However, in addition to the chip error, actually the "setting value" illustrated in FIG. 17 is also set in association with the correction value for correcting the skew of the LEDA 284 illustrated in FIG. 8.

The pixel data output from the correction line memory 212 is input to the LEDA lighting control unit 215 through the switch 217*c* as illustrated in FIG. 11B. The LEDA lighting control unit 215 causes the LEDA 284 to emit light according to the input pixel data.

As described above, when the LEDA 284 is connected, the pixel data output from the speed transforming unit 211 is converted into pixel data configuring the pattern generated in the superimposed manner via the pattern generating unit 214 and then input to the correction line memory 212. That is, the pattern generated by the pattern generating unit 214 is subjected to correction according to the register setting value illustrated in FIG. 17 in the correction line memory 212.

When the LEDA 284 is connected as the light source, because the image collapses locally on the main scanning line as described with reference to FIG. 9, it is desirable to execute correction after the pattern is generated in view of a degree of accuracy at the time of subsequent reading. On the other hand, in the case of FIG. 11A, there has been a problem in that the pattern collapses due to correction, so that a degree of accuracy at the time of subsequent reading degrades. However, when the LEDA 284 is connected, correction is performed in units of 1/N pixels, and thus the pattern does not considerably collapse at the shift position of the pixel as in FIG. 11A.

As described above, in the light source control circuit 210 according to the present embodiment, by providing the switches 217*a* to 217*d*, it is possible to interchange an order in which the frequency-transformed pixel data passes through the correction line memory 212 and the pattern generating unit 214, and it is also possible to switch between the LEDA lighting control unit 215 and the LD lighting control unit 216 to which the pixel data is to be input. As a result, any one of the LD light source device 281 and the LEDA 284 is connectable as the light source and it is possible to configure the optical writing device that can perform appropriate image formation output without deteriorating the image quality.

The above embodiment has been described in connection with the example in which the pixel data correcting unit configured with the correction line memory 212 and the correction control unit 213 stores pixel data in the line memory for each of the main scanning lines, and when pixel data is output from the line memory, the corresponding main scanning line is shifted. However, when pixel data is stored in the line memory, the line memory for storing the pixel data may be shifted in the main scanning direction according to the register setting value, and the pixel data may be output for each of the main scanning lines when the pixel data is to be output.

According to the present invention, it is possible to efficiently design a circuit of an optical writing device capable of supporting different kinds of light sources, whereby reducing the manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source control circuit of an optical writing device that admits connection of any one of a plurality of different kinds of light sources and that forms an electrostatic latent image on a photosensitive element by a connected light source controlled by the light source control circuit, the light source control circuit comprising:

a pixel data output unit that outputs, based on information of an image to be formed as the electrostatic latent image, pixel data that is information of pixels configuring the image for each of the main scanning lines;

a pixel data correcting unit that corrects a skew between the main scanning line of the electrostatic latent image formed by the light source and the photosensitive element and a local deviation of the electrostatic latent image formed by the light source on the main scanning line by acquiring the pixel data and by performing a predetermined process, and outputs pixel data;

a pattern generating unit that outputs pixel data for forming a predetermined pattern in an electrostatic latent image to be formed by acquiring the pixel data and by performing a predetermined process;

a first light source control unit for causing a first light source, that needs correction of the local deviation of the electrostatic latent image on the main scanning line, to emit light based on pixel data to be input;

a second light source control unit for causing a second light source, that does not need correction of the local deviation of the electrostatic latent image on the main scanning line, to emit light based on pixel data to be input; and a switch that switches, based on a setting value, between a first transmission status, in which pixel data output from the pixel data output unit is transmitted to the pixel data correcting unit, the pattern generating unit, and the second light source control unit in this order, and a second transmission status, in which the pixel data is transmitted to the pattern generating unit, the pixel data correcting unit, and the first light source control unit in this order.

2. The light source control circuit according to claim 1, wherein the switch includes:

a first switch that inputs any one of a first pixel data output from the pixel data output unit and a second pixel data output from the pattern generating unit to the pixel data correcting unit according to a setting value;

a second switch that inputs any one of the first pixel data output from the pixel data output unit and a third pixel data output from the pixel data correcting unit to the pattern generating unit according to a setting value, a third switch that inputs the third pixel data output from the pixel data correcting unit to the first light source control unit according to a setting value, and a fourth switch that inputs the second pixel data output from the pattern generating unit to the second light source control unit according to a setting value.

3. The light source control circuit according to claim 1, wherein the pixel data correcting unit corrects, in the first status, skew between the light source and the photosensitive element by storing acquired pixel data in a line memory for each of main scanning lines, by shifting the main scanning line of the line memory in a sub-scanning direction at a position, on the main scanning line, corresponding to a setting value, and by reading the pixel data.

4. The light source control circuit according to claim 1, wherein the pixel data correcting unit corrects, in the second status, the skew between the light source and the photosensitive element and the local deviation by storing acquired pixel data in a line memory for each of main scanning lines, dividing the main scanning line and increasing a resolution in sub-scanning direction by a plurality of times by successively reading the pixel data from each of the main scanning line in the line memory by a number of times according to a setting value to be input, shifting the main scanning line for reading the pixel data in the sub-scanning direction at a position, on the main scanning line, corresponding to a setting value, and reading the pixel data.

5. The light source control circuit according to claim 1, wherein a light emitting diode (LED) light source is connectable as the first light source, and the pixel data correcting unit corrects an assembly error of an LED chip in the LED light source as the local deviation.

6. An image forming apparatus, comprising:

an optical writing device controlled by the light source control circuit according to claim 1.

7. A control method of a light source control circuit in an optical writing device that admits connection of any one of a plurality of different kinds of light sources and that forms an electrostatic latent image on a photosensitive element by a connected light source controlled by the light source control circuit that includes a pixel data output unit that outputs, based on information of an image to be formed as the electrostatic latent image, pixel data that is information of pixels configuring the image for each of main scanning lines, a pixel data correcting unit that corrects a skew between main scanning line of the electrostatic latent image formed by the light source and the photosensitive element and a local deviation of the electrostatic latent image formed by the light source on the main scanning line by acquiring the pixel data and by performing a predetermined process, and outputs pixel data, a pattern generating unit that outputs pixel data for forming a predetermined pattern in an electrostatic latent image to be formed by acquiring the pixel data and by performing a predetermined process, a first light source control unit for causing a first light source, that needs correction of the local deviation of the electrostatic latent image on the main scanning line, to emit light based on pixel data to be input, and a second light source control unit for causing a second light source, that does not need correction of the local deviation of the electrostatic latent image on the main scanning line, to emit light based on pixel data to be input, the method comprising:

switching, based on a setting value, between a first transmission status and a second transmission status, both in which the pixel data is output from the pixel data output unit, wherein the first transmission status is a status in which the pixel data is transmitted to the pixel data correcting unit, the pattern generating unit, and the second light source control unit in this first order, and the second transmission status is a status in which the pixel data is transmitted to the pattern generating unit, the pixel data correcting unit, and the first light source control unit in this second order.

* * * * *